United States Patent
Weigold et al.

(10) Patent No.: US 6,553,499 B1
(45) Date of Patent: Apr. 22, 2003

(54) LOW POWER CIRCUIT FOR WAKING FROM A SLEEP MODE BY USING A REMOTE POWER-ON SIGNAL

(75) Inventors: Thomas Weigold, Baden-Baden (DE); Stefan Koch, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/403,473
(22) PCT Filed: Mar. 21, 1998
(86) PCT No.: PCT/DE98/00838
§ 371 (c)(1), (2), (4) Date: Oct. 22, 1999
(87) PCT Pub. No.: WO98/48341
PCT Pub. Date: Oct. 29, 1998

(30) Foreign Application Priority Data

Apr. 23, 1997 (DE) .......................... 197 17 012

(51) Int. Cl.[7] ................................. G06F 1/26
(52) U.S. Cl. .................. 713/300; 713/310; 323/318
(58) Field of Search ................ 713/300, 310; 323/318

(56) References Cited

U.S. PATENT DOCUMENTS

| | | | |
|---|---|---|---|
| 5,489,809 A | | 2/1996 | Kaya et al. |
| 5,621,250 A | * | 4/1997 | Kim ............................ 713/321 |
| 5,625,312 A | * | 4/1997 | Kawakami et al. ......... 327/483 |
| 5,689,715 A | | 11/1997 | Crump et al. |
| 5,767,844 A | * | 6/1998 | Stoye .......................... 345/212 |
| 5,991,887 A | * | 11/1999 | Ezell .......................... 713/340 |
| 6,269,288 B1 | * | 7/2001 | Smith .......................... 700/295 |
| 6,316,844 B1 | * | 11/2001 | Arima .......................... 307/65 |
| 6,414,864 B1 | * | 7/2002 | Hoshi .......................... 363/69 |
| 6,453,423 B1 | * | 9/2002 | Loison ........................ 713/310 |

FOREIGN PATENT DOCUMENTS

WO 97 12346 4/1997

* cited by examiner

Primary Examiner—Thomas Lee
Assistant Examiner—Eric Chang
(74) Attorney, Agent, or Firm—Kenyon & Kenyon

(57) ABSTRACT

An electronic circuit which has a voltage terminal, a switch, a voltage stabilizer and a computer. In addition, an interface terminal is provided, via which the computer can exchange data via an interface. After a supply voltage is applied at the voltage terminal, the switch (11) is initially closed so that the circuit has an extremely low quiescent current. A signal at the interface terminal causes the switch to close and the voltage stabilizer and the computer are activated.

12 Claims, 1 Drawing Sheet

LOW POWER CIRCUIT FOR WAKING FROM A SLEEP MODE BY USING A REMOTE POWER-ON SIGNAL

FIELD OF THE INVENTION

The present invention relates to an electronic circuit.

BACKGROUND INFORMATION

Electronic circuits having a computer with an interface for the exchange of serial data are already known. Switches are provided via which the computer can be optionally connected to a voltage connection. No provisions are made for activating the switch by signals at the interface terminal.

In addition, computers are known that have a serial interface and that can be placed into a so-called sleep mode. In sleep mode, parts of the computer are no longer supplied with voltage resulting in a lower power consumption by the computer in this operating state. The computer can be switched from the sleep mode into an active state again by signals via the serial interface. However, it is necessary for at least parts of the computer to remain activated in order to process the signals present at the interface terminal. Such computers must therefore also be supplied with a non-negligible quiescent current even in sleep mode.

SUMMARY OF THE INVENTION

In contrast, the advantage of the electronic circuit according to the present invention is that the computer can be activated by a signal at the interface terminal and the power consumption in the inactivated state is particularly low at the same time. In the inactivated state, a current demand of less than 300 $\mu$A can be attained in this manner.

The second switch causes the computer to be connected by a single signal at the interface terminal to the voltage connection and to remain connected thereafter. The design of the first switch as a pnp transistor makes it possible for the switch to be used with serial data cables which have a high level in the sleep mode. The design of the first switch as an npn transistor makes it possible for the device to be used with serial data cables which have a LOW level in the sleep mode. Since the gate terminal of the second switch can be connected to ground potential by the computer, the power supply for the computer can again be terminated by the computer. A Zener diode can be used for decoupling the first switch and the second switch from voltage. The gate terminal of the first switch and the interface terminal can also be separated from each other by a diode, with the result that after the first switch is closed, the potentials at the interface terminal no longer have an effect on the gate terminal of the first switch. An interface can be provided in the computer for data interchange.

DETAILED DESCRIPTION

Figure 1:
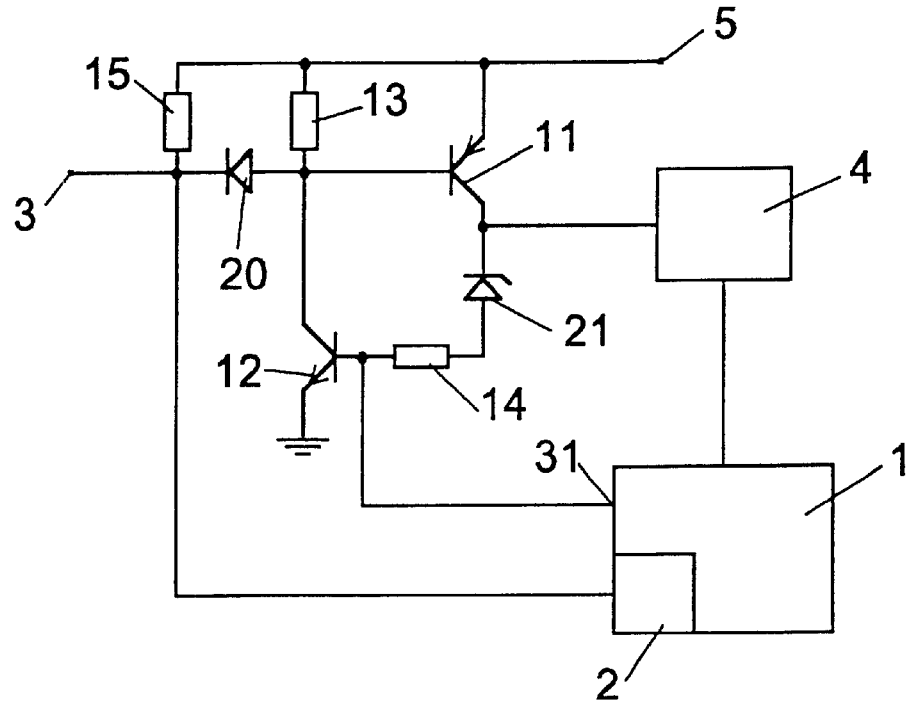
FIG. 1 illustrates a first embodiment of an electronic circuit according to the present invention.

FIG. 1 shows an electronic circuit having a computer 1. Computer 1 is provided with an interface 2 which is connected to an interface terminal 3 via a suitable cable. Interface 2 contains the necessary hardware for communication via data cables. A serial data transmission cable can be connected to interface terminal 3. Computer 1 is connected via an additional cable to a voltage stabilizer 4, which in turn is connected to voltage terminal 5 via a first switch 11. A supply voltage, for example 12 volts, is applied to voltage terminal 5, the supply voltage serving to supply the entire electronic circuit with voltage. Switch 11 is in this case designed as a pnp transistor, its emitter being connected to voltage terminal 5 and its collector to voltage stabilizer 4. When switch 11 is closed, voltage stabilizer 4 is connected to voltage terminal 5 so that computer 1 is supplied with an operating voltage or operating current via voltage stabilizer 4. First switch 11 has a gate terminal in the form of a base. This gate terminal is connected to voltage terminal 5 via a first resistor 13. In addition, voltage terminal 5 is connected to interface terminal 3 via a third resistor 15. In addition, the base of pnp transistor 11 is connected to the anode of a diode 20. The cathode of diode 20 is connected with interface terminal 3. In addition, a second switch 12 is provided, which here is designed in the form of an npn transistor. The emitter of npn transistor 12 is connected to a ground terminal. The collector of npn transistor 12 is connected to the base terminal of pnp transistor 11. The base of npn transistor 12 is connected to the anode of a Zener diode 21 via a resistor 14. The cathode of Zener diode 21 is connected to the collector of pnp transistor 11. In addition, the base of npn transistor 12 is connected with an output 31 of computer 1.

In order to describe the function of the circuit of FIG. 1, it is initially assumed that a positive operating voltage is present at the voltage terminal and no additional voltages are applied to interface terminal 3. A positive voltage is then applied to the base of pnp transistor 11 via first resistor 13 so that pnp transistor 11 is blocked. Consequently, voltage stabilizer 4 is not supplied with operating voltage so that also no operating voltage is available to computer 1. In this state, the power consumption of the circuit shown in FIG. 1 is particularly low, since essentially only parasitic currents can flow. Interface terminal 3 is also kept at the positive supply voltage of voltage terminal 5 via resistor 15 as long as the circuit is not connected via interface terminal 3 to other electronic circuits which pull interface terminal 3 to a different potential. Since resistors 13 and 15 have the function of keeping the base of pnp transistor 11 or interface terminal 3 at a higher potential, they are as a rule also described as pull-up resistors. The resistors are designed in such a way that a low-impedance connection to ground can pull the base of pnp transistor 11 or interface terminal 3 to a lower potential. After an initial application of a positive supply voltage at voltage terminal 5, the circuit according to FIG. 1 is thus initially in a sleep mode in which computer 1 is not supplied with supply voltage and consequently only low currents flow.

In order to activate computer 1, interface terminal 3 can be connected to ground with low impedance by, for example, an additional circuit which is not shown here. This potential is then also applied to the base of pnp transistor 11 via diode 20 so that this transistor changes from the blocked state to the conducting state. The first switch represented by pnp transistor 11 is thus changed from an open state to a closed state so that voltage stabilizer 4 is then connected to voltage terminal 5 via now closed switch 11. Voltage stabilizer 4 then makes an operating voltage available to computer 1 with the result that the latter is activated. Via Zener diode 21 and second resistor 14, the positive operating voltage of voltage terminal 5 is of course also present at the base of npn transistor 12 so that this transistor is also switched from the blocked state to the conducting state. Switch 12 formed by npn transistor 12 is thus also brought from an open state into a closed state, whereby it connects the base of pnp transistor 11, i.e., the gate terminal of switch 11, to a ground terminal with low impedance. Second switch 12 thus causes a locking to take place, i.e., after switch 11 is once closed, switch 12 ensures that this state is also maintained, irrespective of the electrical potential subsequently present at interface terminal 3. Diode 20 ensures that any potential can be applied to interface terminal 3 despite the low-impedance connection of the base of pnp transistor 11 to ground. The circuit according to FIG. 1 can thus be placed in a state of operational readiness by a one-time signal at interface terminal 3. Through the use of a pnp transistor 11 as the first switch, the electronic circuit is intended for use with a serial data bus in which the sleep state of the data transmission cable is produced by a high potential. Information then causes the data transmission cable to be placed bitwise into a low state. In the present case the low potential is, for example, produced by connection to a ground terminal. Consequently, the electronic circuit thus formed is initially in a sleep state after a power on, i.e., after the application of a supply voltage, the power consumption being exceptionally low, since only parasitic currents flow. A quiescent current of less than 300 μA can be attained in this manner. A single signal on the serial data transmission cable can then place the circuit in a state of operational readiness. It is also significant that no additional connections are required for activation but rather one connection can be used simultaneously for the serial data transmission cable and the activation signal.

In addition, it may also be desirable to place the already activated circuit back in an inactive state. For this purpose, computer 1 has an output 31, to which ground potential from computer 1 can be applied. Since this terminal 31 is connected to the base of npn transistor 12 by a suitable cable, computer 1 can close switch 12 again. Since the low-impedance connection to ground no longer exists then, the base of pnp transistor 11 is again pulled to the positive supply potential at voltage terminal 5 via pull-up resistor 13. Resistor 14 or Zener diode 21 with a typical operating point of 5 volts ensures that switch 12 and switch 11 open reliably. This is due to the fact that voltage decoupling between the two circuits is assured by Zener diode 21. It is thus brought about that switch 12 is already completely open before computer 1 is isolated from the supply voltage at voltage terminal 5 by switch 11. Otherwise, a repeated power off and power on, i.e., an oscillation could occur. As an alternative, it is also possible for voltage stabilizer 4 to contain storage elements, capacitors for example, which continue to maintain the operational readiness of computer 1 for a brief time after switch 11 is opened. In this case also, computer 1 could be isolated from voltage terminal 5 without Zener diode 21 being required for this purpose.

Figure 2:
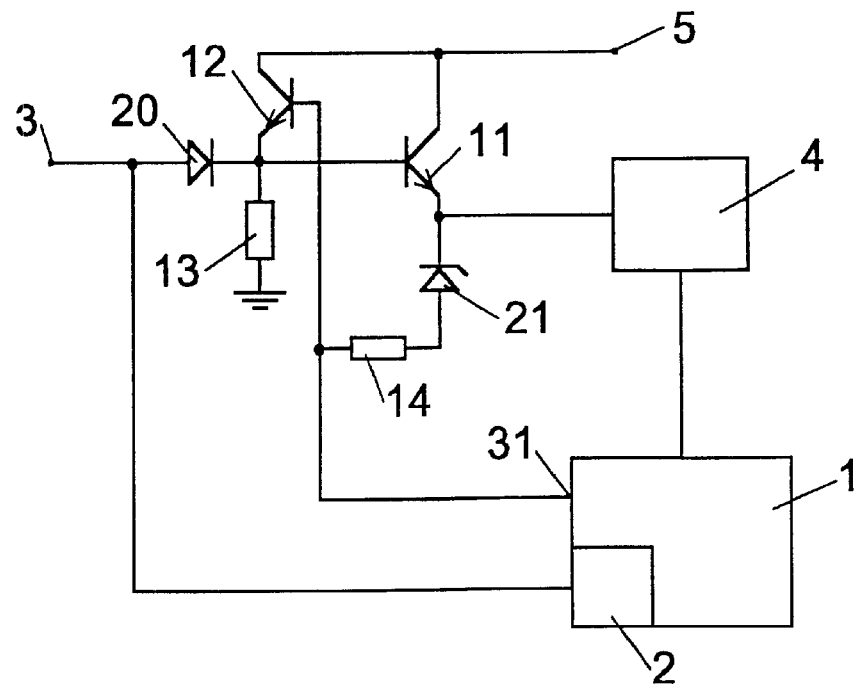
FIG. 2 illustrates a second embodiment of an electronic circuit according to the present invention.

FIG. 2 shows an additional embodiment which is suitable for data transmission cables whose idle state is a low potential or ground potential and which then transmit data by bitwise application of high voltages. Computer 1, interface 2, interface terminal 3, voltage stabilizer 4 and voltage terminal 5 correspond to the components already known from FIG. 1. In this case, first switch 11 is designed as an npn transistor whose collector is connected to voltage terminal 5, whose emitter is connected to voltage stabilizer 4 and whose base terminal is connected to the cathode of a diode 20. The anode of diode 20 is connected to interface terminal 3. Furthermore, the base of npn transistor 11 is connected to a ground terminal via a resistor 13. An npn transistor 12 is provided as a second switch in this case, the transistor's cathode being connected to voltage terminal 5 and its emitter being connected to the base terminal of npn transistor 11. The base of npn transistor 12 is again connected to a terminal 31 of computer 1. Furthermore, the base of transistor 12 is connected to the anode of Zener diode 21 via a resistor 14. The cathode of Zener diode 21 is connected to the emitter of transistor 11.

As can be recognized, no pull-up resistors are provided so that after a voltage is applied to voltage terminal 5, first switch 11 initially stays closed as long as no positive voltage is also applied to interface terminal 3. This corresponds to the inactive state of the circuit. If a positive potential is briefly applied to interface terminal 3, switch 11 is closed and voltage stabilizer 4 is connected to voltage terminal 5. In addition, a positive voltage is also applied to the base of transistor 12 so that switch 12 is then closed. As a result, supply voltage 5 is then applied at a low impedance to the base terminal of switch 11 so that the power on state is maintained. The computer can then be decoupled from voltage terminal 5 again by the application of ground potential at terminal 31 of computer 1. Diodes 20 and 21 again serve the purpose of decoupling from the voltage.

What is claimed is:

1. An electronic circuit comprising:

a computer;

a voltage terminal;

an interface terminal, the computer configured to exchange serial data via the interface terminal;

a first switch, the first switch being electrically coupled between the computer and the voltage terminal, the first switch being a controllable switch, the first switch having a first gate terminal, the first gate terminal being coupled to the interface terminal, the first gate terminal being connectable via a first resistor to a first potential, the first switch being opened when the first potential is applied to the first gate terminal, the first switch being closed when a second potential is applied to the first gate terminal; and a second switch, the second switch being a controllable switch having a second gate terminal, the first gate terminal being connectable via the second switch to the second potential, a third potential being connectable to the second gate terminal when the first switch is open, the second switch remaining open when the third potential is connected to the second gate terminal.

2. The electronic circuit according to claim 1, wherein the first gate terminal is connected to the first potential via the first resistor, and the first gate terminal is connected to the second potential via the second switch.

3. The electronic circuit according to claim 2, wherein the first switch is a pnp transistor, and the second switch is an npn transistor, an emitter of the pnp transistor being connected to the voltage terminal, a collector of the pnp transistor being connected to a base of the npn transistor via a second resistor, an emitter of the npn transistor being connected to a ground terminal, a collector of the npn transistor being connected to the first gate terminal.

4. The electronic circuit according to claim 1, wherein the first switch and the second switch are npn transistors, a collector of the first switch being connected to the voltage terminal, an emitter of the first switch being connected to the second gate terminal via a second resistor, a collector of the second switch being connected to the voltage terminal, an emitter of the second switch being connected to a ground terminal via the first resistor.

5. An electronic circuit, comprising:
   a computer;
   a voltage terminal;
   an interface terminal, the computer configured to exchange serial data via the interface terminal;
   a first switch electrically coupled between the computer and the voltage terminal, the first switch bing a controllable switch, the first switch having a first gate terminal, the first gate terminal being coupled to the interface terminal, the first gate terminal being connectable via a first resistor to a first potential, the first switch being opened when the first potential is applied to the first gate terminal, the first switch being closed when a second potential is applied to the first gate terminal; and
   a second switch, the second switch being a controllable switch having a second gate terminal, the first gate terminal being connectable via the second switch to the second potential when the first switch is open, the second switch remaining open when a third potential is connected to the second gate terminal;
      wherein the second gate terminal is connected to an output of the computer, the computer configured to selectively apply a ground potential to the second gate terminal via the output of the computer.

6. The electronic circuit according to claim 5, further comprising a zener diode connected between the first switch and a second resistor, an anode of the zener diode being connected to the second resistor, a cathode of the zener diode being connected to the first switch.

7. The electronic circuit according to claim 1, further comprising a diode connected between the first gate terminal and the interface terminal.

8. The electronic circuit according to claim 1, wherein the computer includes an interface, the interface being connected to the interface terminal.

9. The electronic circuit according to claim 1, wherein the first switch is configured to selectably apply a potential at the voltage terminal the computer.

10. An electronic circuit comprising:
    a computer;
    a voltage terminal;
    an interface terminal, the computer being capable of exchanging serial data via the interface terminal;
    a first switch, the first switch being electrically coupled between the computer and the voltage terminal, the first switch being a controllable switch, the serial data influencing the state of the first switch, the first switch having a first gate terminal, the first gate terminal being coupled to the interface terminal, the first gate terminal being connectable via a first resistor to a first potential, the first switch being opened when the first potential is applied to the first gate terminal, the first switch being closed when a second potential is applied to the first gate terminal; and
    a second switch, the second switch being a controllable switch having a second gate terminal, the first gate terminal being connectable via the second switch to the second potential, a third potential being connectable to the second gate terminal when the first switch is open, the second switch remaining open when the third potential is connected to the second gate terminal.

11. An electronic circuit comprising:
    a computer;
    a voltage terminal;
    an interface terminal, the computer being capable of exchanging serial data via the interface terminal;
    a first switch, the first switch being electrically coupled between the computer and the voltage terminal, the first switch being a controllable switch, the first switch having a first gate terminal, the first gate terminal being coupled to the interface terminal, the first gate terminal being connectable via a first resistor to a first potential, the first switch being opened when the first potential is applied to the first gate terminal, the first potential being supplied to the computer when the first switch is closed, the first switch being closed when a second potential is applied to the first gate terminal; and
    a second switch, the second switch being a controllable switch having a second gate terminal, the first gate terminal being connectable via the second switch to the second potential, a third potential being connectable to the second gate terminal when the first switch is open, the second switch remaining open when the third potential is connected to the second gate terminal.

12. An electronic circuit comprising:
    a computer;
    voltage terminal;
    an interface terminal, the computer being capable of exchanging serial data via the interface terminal;
    a first switch, the first switch being electrically coupled between the computer and the voltage terminal, the first switch being a controllable switch, the first switch having a first gate terminal, the first gate terminal being coupled to the interface terminal, the first gate terminal being connected via a first resistor to a first potential, the first switch being opened when the first potential is applied to the first gate terminal, the first switch being closed when a second potential is applied to the first gate terminal, the first potential being supplied to the computer when the first switch is closed, the first potential not being supplied to the computer when the first switch is open; and
    a second switch, the second switch being a controllable switch having a second gate terminal, the first gate terminal being connected via the second switch to the second potential, the second gate terminal being connected to an output of the computer, a computer supplied third potential being connectable to the output of the computer when the first switch is open, the second switch remaining open when the third potential is connected to the output of the computer.

* * * * *

UNITED STATES PATENT AND TRADEMARK OFFICE
CERTIFICATE OF CORRECTION

PATENT NO.      : 6,553,499 B1
DATED           : April 22, 2002
INVENTOR(S)     : Thomas Weigold et al.

It is certified that error appears in the above-identified patent and that said Letters Patent is hereby corrected as shown below:

<u>Title page,</u>
Item [57], ABSTRACT,
Line 5, delete "11".

<u>Column 1,</u>
Line 12, delete "already".

Signed and Sealed this

First Day of June, 2004

JON W. DUDAS
*Acting Director of the United States Patent and Trademark Office*